United States Patent
Pamer

(10) Patent No.: US 10,521,205 B2
(45) Date of Patent: Dec. 31, 2019

(54) HOSTABLE COMPILER UTILIZING TYPE INFORMATION FROM A HOST APPLICATION

(71) Applicant: MICROSOFT TECHNOLOGY LICENSING LLC., Redmond, WA (US)

(72) Inventor: Joseph Pamer, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 304 days.

(21) Appl. No.: 15/401,497

(22) Filed: Jan. 9, 2017

(65) Prior Publication Data
US 2017/0115971 A1   Apr. 27, 2017

Related U.S. Application Data

(63) Continuation of application No. 13/293,150, filed on Nov. 10, 2011, now Pat. No. 9,542,168.

(51) Int. Cl.
*G06F 8/41* (2018.01)

(52) U.S. Cl.
CPC .................. *G06F 8/437* (2013.01)

(58) Field of Classification Search
CPC ..................................... G06F 8/437
USPC .......................................... 717/141
See application file for complete search history.

(56) References Cited

U.S. PATENT DOCUMENTS

| 5,640,558 | A | * | 6/1997 | Li | G06F 8/75 717/116 |
| 5,875,334 | A | * | 2/1999 | Chow | G06F 8/427 717/141 |
| 8,281,288 | B1 | * | 10/2012 | Spencer | G06F 8/20 709/201 |
| 2003/0153386 | A1 | * | 8/2003 | Lydon | G06Q 10/06 463/40 |
| 2003/0225935 | A1 | | 12/2003 | Rivard et al. | |
| 2007/0055978 | A1 | | 3/2007 | Meijer et al. | |
| 2007/0094649 | A1 | * | 4/2007 | Chatterjee | G06F 8/41 717/140 |
| 2007/0234288 | A1 | | 10/2007 | Lindsey et al. | |
| 2008/0005547 | A1 | | 1/2008 | Papakipos et al. | |
| 2008/0320444 | A1 | | 12/2008 | Meijer et al. | |
| 2008/0320453 | A1 | | 12/2008 | Meijer et al. | |

(Continued)

OTHER PUBLICATIONS

Elsman, Martin; "SMLtoJs: Hosting a Standard ML compiler in a Web Browser"; ACM, 2011, 11pg. (Year: 2011).*

(Continued)

*Primary Examiner* — Ryan D. Coyer

(57) ABSTRACT

A hostable compiler interacts with a host application to enable the host application to execute program code supported by the hostable compiler. The host application and the hostable compiler exchange data through an interface that allows the hostable compiler to receive type information pertaining to data elements used applications executing within the host application process. This type information may then be used by the hostable compiler in the compilation of source code to infer a type for data elements used in the source code that are not declared yet associated with a value of an expression used in an application executed within the host application process.

19 Claims, 6 Drawing Sheets

(56) References Cited

U.S. PATENT DOCUMENTS

| | | | | |
|---|---|---|---|---|
| 2009/0024986 A1* | 1/2009 | Meijer | ............... | G06F 8/41 717/137 |
| 2009/0251475 A1 | 10/2009 | Mathur et al. | | |
| 2011/0016449 A1 | 1/2011 | Yao et al. | | |
| 2012/0096449 A1 | 4/2012 | Yang et al. | | |
| 2015/0128116 A1* | 5/2015 | Chen | ............... | G06F 8/10 717/154 |

OTHER PUBLICATIONS

Leal et al., "Mooshak: a Web-based multi-site programming contest system"; Wiley, 2003,15pg. (Year: 2003).*
Truong et al., "A Web Based Environment for Learning to Program", Australian Computer Society, 2003, 10pg. (Year: 2003).*
"MaxCompile", Retrieved From <<http://www.maxeler.com/content/briefings/MaxelerWhitePaperMaxCompiler.pdf>>, Retrieved Date: Feb. 27, 2011, 4 Pages.
"The nhc98 compiler", Retrieved From <<https://www.haskell.org/nhc98/>>, Retrieved Date: Sep. 8, 2011, 2 Pages.
"Final Rejection Issued in U.S. Appl. No. 13/293,150", dated Mar. 26, 2014, 29 Pages.
"Final Rejection Issued in U.S. Appl. No. 13/293,150", dated Oct. 22, 2014, 32 Pages.
"Final Rejection Issued in U.S. Appl. No. 13/293,150", dated Aug. 28, 2015, 28 Pages.
"Non Final Rejection Issued in U.S. Appl. No. 13/293,150", dated Apr. 9, 2015, 29 Pages.
"Non Final Rejection Issued in U.S. Appl. No. 13/293,150", dated Sep. 16, 2013, 27 Pages.
"Non Final Rejection Issued in U.S. Appl. No. 13/293,150", dated Jul. 3, 2014, 30 Pages.
"Non Final Rejection Issued in U.S. Appl. No. 13/293,150", dated Jan. 22, 2016, 21 Pages.
"Notice of Allowance Issued in U.S. Appl. No. 13/293,150", dated Aug. 15, 2016, 8 Pages.
Bloss, et al., "An Optimising Compiler for a Modern Functional Language". In the Computer Journal—Special issue on Lazy functional programming, vol. 32, Issue 2, Apr. 1989, 10 Pages.
Chang, et al., "Efficient Just-In-Time Execution of Dynamically Typed Languages Via Code Specialization Using Precise Runtime Type Inference", In Technical Report ICS-TR-07-10, Donald Bren School of Information and Computer Science, University of California, Jan. 2007,14 Pages.
Chlipala, Adam, "A Verified Compiler for an Impure Functional Language", In Proceedings of the 37th Annual ACM SIGPLAN-SIGACT Symposium on Principles of Programming Languages, Jan. 17, 2010, 14 Pages.
Furr, et al., "Polymorphic Type Inference for the JNI", In Computer Science Division Tech Report, University of Maryland, College Park, Nov. 4, 2005, 22 Pages.
Mehnert, Hannes, "Extending Dylan's Type System for Better Type Inference and Error Detection", In Proceedings of the International Conference on Lisp, Oct. 19, 2010, 10 Pages.
Salis, Michael, "Starkiller: A Static Type Interference and Compiler for Python", In Partial Fulfillment of the Requirements for the Degree of Master of Engineering in Electrical Engineering and Computer Science at the Massachusetts Institute of Technology, May 2004, 96 Pages.

* cited by examiner

HOSTABLE COMPILER UTILIZING TYPE INFORMATION FROM A HOST APPLICATION

CROSS REFERENCE TO RELATED APPLICATIONS

This is a continuation of application Ser. No. 13/293,150 filed on Nov. 10, 2011, entitled "HOSTABLE COMPILER UTILIZING TYPE INFORMATION FROM A HOST APPLICATION", the entirety of which is incorporated by reference.

BACKGROUND

Extending the functionality of a software application, in some cases, may be easier than creating a new software application that has the additional capabilities. An extension programming language is often embedded in an existing software application so that additional program code may be added to the software application to provide additional capabilities. The extension programming language may be a scripting language whose interpreter is embedded as a library into the software application. The scripting language code is interpreted at runtime thereby bypassing compilation. In this manner, the additional capabilities may be incorporated into the software application quickly and in a cost-efficient way. However, the runtime performance of the software application degrades due to the additional time consumed by the scripting language interpreter. In addition, semantic errors are not detected before execution of the software application thereby increasing the likelihood of erroneous calculations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A host application may be configured to execute interpreted source code and to utilize a hostable compiler to execute compiled source code. The hostable compiler runs as a plugin to the host application. The host application and the hostable compiler exchange data through an interface that allows the hostable compiler to receive type information pertaining to the value of expressions used in the interpreted source code. This type information may then be used by the hostable compiler in the compilation of the compiled source code to infer a type for the value of an expression not explicitly declared in the compiled source code yet associated with a value in the interpreted source code.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
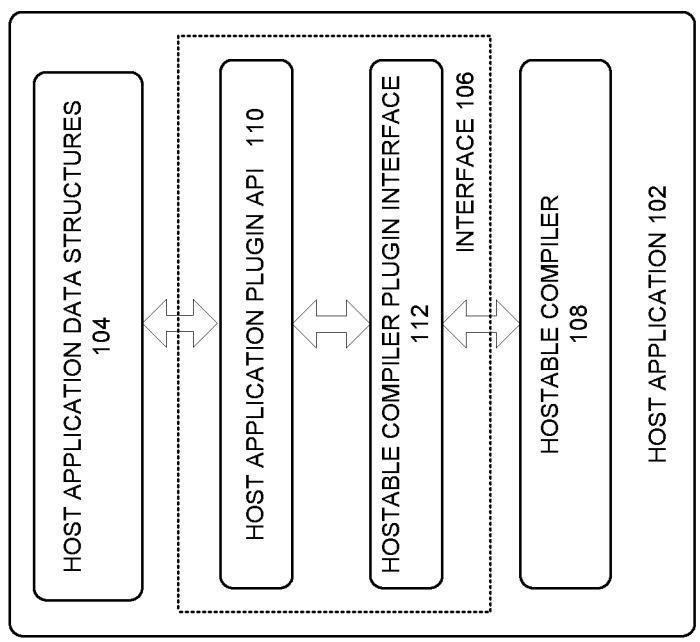
FIG. 1 illustrates an exemplary system having a hostable compiler utilizing type information from a host application.

Various embodiments are directed to a compiler configured to execute within the same process as a host application. The compiler may be associated with a strongly typed functional programming language that supports type inference. The software application may execute source code written in an interpreted programming language and source code written in a strongly typed functional programming language. The hostable compiler includes an interface that receives type information from the host application pertaining to data elements used in the interpreted source code. The hostable compiler is then able to utilize this type information to infer a type for values of expressions missing an associated type during the compilation of the compiled source code.

Data used by a software application is classified in accordance with a type. A type identifies an attribute associated with the data such as integer, Boolean, floating point, character, array and the like. Every data element used in a program, such as a variable, constant, method, and expression that generates a value, has a type. Every method has a type for its input parameters and its return value. Types are used to ensure that operations are performed without errors thereby guaranteeing the runtime behavior of the software application.

A compiler performs type checking to verify that the type of a value of an expression is compatible and consistent with the type system of the programming language. A type system is the set of types supported by a programming language and the relationships between the types and elements of the programming language. The compiler performs type checking using the type system of a programming language to verify that the source code is in compliance with the type system of the programming language.

Type checking may be performed during compilation and is referred to as static typing. Programming languages performing static typing are referred to as strongly type languages. Examples of strongly typed languages are functional programming languages, such as C# and F#, as well as Java, Fortran, Ada, Pascal, Visual Basic for Applications, and the like. Type checking may be performed during runtime and is referred to as dynamic typing. Programming languages performing dynamic typing are referred to as dynamic type languages and include Lisp, JavaScript, Prolog, Perl, Luna, and the like.

Some programming languages support type inference which is when a compiler infers a missing type based on contextual information. For example, the value of an expression may not have a declared type yet the two operands in the expression are associated with an integer type. From the context of the expression using two integer operands, the compiler may infer an integer type as the type of the value of the expression.

A type environment is the set of type systems known by the compiler. The type environment typically includes the types explicitly declared in the source code. For example, the source code may contain a type declaration, int x, y, z, which declares variables x, y, and z with an integer type. In addition, the source code may reference external types which are also included in the type environment. For example, the source code may contain a code segment, #include types.dll, where types.dll contains a type declaration, int a,b,c, that declares variables a, b, and c with an integer type. In addition, the compiler described herein utilizes the types declared in an interpreted source code to infer a missing type for the value of an expression used in the compiled source code executing within the host application process.

Attention now turns to a discussion of an exemplary system utilizing a hostable compiler. FIG. 1 illustrates a block diagram of a host application 102. Although the system 100 as shown in FIG. 1 has a limited number of elements in a certain configuration, it may be appreciated that the system 100 may include more or less elements in alternate configurations as desired for a given implementation.

The host application 102 may contain internal data structures 104, an interface 106, and a hostable compiler 108. The host application 102 may be a software application configured to execute program code. For example, the host application 102 may be a web browser that executes the HTML code representing a web page. The host application's internal data structures 104 may represent the HTML code and metadata including type information pertaining to the data elements in the HTML code.

The interface 106 may be used to transfer data, such as the host application's internal data structures 104, from the host application 102 to the hostable compiler 108. The interface 106 may contain a host application plugin application programming interface (API) 110 and a hostable compiler plugin interface 112. The host application plugin API 110 packages the host application's data structures into a format that is recognizable by the hostable compiler. The hostable compiler plugin interface 112 receives the packaged data structures and converts them into a format recognizable by the hostable compiler 108.

The host application 102, the interface 106, and the hostable compiler 108 may be a sequence of computer program instructions, that when executed by a processor, causes the processor to perform methods and/or operations in accordance with a prescribed task. The host application 102, the interface 106, and the hostable compiler 108 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In several embodiments, the hostable compiler 108 may be a compiler configured to execute within the .NET framework. The .NET framework is a common software execution environment that provides tools and libraries to execute applications written in different programming languages. The .NET framework includes a Common Language Runtime (CLR), a Common Type System (CTS), and a Framework Class Library (FCL). The CLR is a common virtual machine that converts intermediate language (IL) code or managed code into machine instructions of an intended target processor. The CTS is a standardized common type system that defines how types are declared, managed, and used in the runtime and supports any programming language within the .NET framework. The FCL is a large library of reusable data elements such as classes, namespaces, interfaces, and the like.

In several embodiments, the hostable compiler 108 may be a configured as a plugin to the host application 102. As a plugin, the hostable compiler 108 registers with the host application 102 to determine a protocol for communicating with the host application 102. The protocol may specify the data that the hostable compiler needs from the host application 102 and the manner in which data is passed between the hostable compiler 108 and host application 102. The protocol may consist of the host application plugin API 110 and the hostable compiler plugin interface 112.

The host application 102 may utilize the host application plugin API 110 to package some of the host application's internal data structures 104 into a format recognizable by the hostable compiler 108. The format may be a Common Object Model (COM) object, an Extensible Markup Language (XML) text, a Java Script Object Notation (JSON) file, a .NET object, or any other predefined format that is agreed upon between the host application 102 and the hostable compiler 108.

For example, in the case of a hostable compiler 108 configured to support the .NET framework, the hostable compiler plugin interface 112 may convert the COM object into a .NET object that may be utilized by the hostable compiler 108. Common Object Model is a common data format used to model objects which is recognized by different programming environments. The COM object may represent a file of source code, code fragments, and so forth. A COM object is recognized within the .NET framework. The COM object is associated with metadata that describes a type associated with each data element contained therein.

Attention now turns to a discussion of the operations of a system utilizing the host application and the hostable compiler. Operations for the embodiments may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 2:
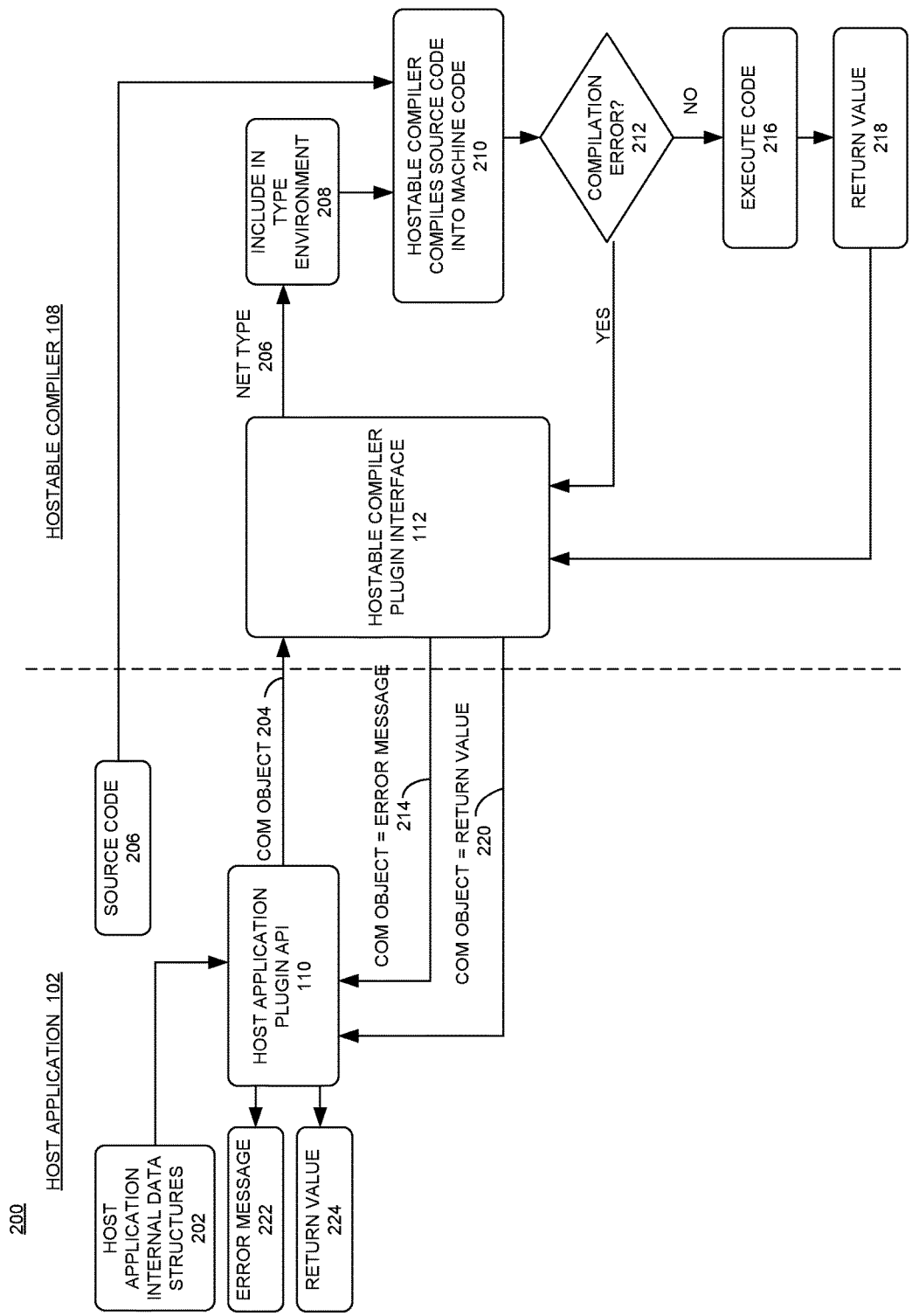
FIG. 2 is a flow diagram illustrating an exemplary method of a hostable compiler and a host application.

FIG. 2 illustrates a flow diagram of an exemplary method. It should be noted that the method 200 may be representative of some or all of the operations executed by one or more embodiments described herein and that the method can include more or less operations than that which is described in FIG. 2.

The hostable compiler 108 may register with the host application 102 as a plugin and request that the host application 102 pass certain of the host application's internal data structures 104 to the hostable compiler 108. The host application 102 may package the data structures 104 into a format which is passed to the host application through the hosted application plugin API 110 (block 202). In an embodiment, the packaged data structures 104 may be passed as a COM object 204 through an API call (block 202).

The hostable compiler plugin interface 112 maps the data elements in the COM object 204 into a corresponding .NET type. The hostable compiler plugin interface 112 may utilize System.Reflection.Emit classes available in the FCR library of the .NET framework to associate .NET types 206 to each data element in the .COM object. The .NET types 206 may then be included into the type environment used by the hostable compiler 108 (block 208).

The host application 102 may then provide the compilation functions of the hostable compiler 108 as a feature of the host application 102. Source code 206 requiring compilation may then be passed to the hostable compiler 108. The hostable compiler 108 compiles the source code into machine code using a type environment that includes the type information obtained from the host application 102 (block 210). If compilation errors are detected (block 212—yes), then the compilation error may be passed to the hostable compiler plugin interface 112. The hostable compiler plugin interface 112 converts the error message into a COM object 214 which is passed to the host application 102 through the host application plugin API 110 (block 222).

If no compilation errors are detected (block 212—no), then the machine code is executed (block 216) and a return value is computed (block 218). The hostable compiler plugin interface 112 passes the return value back as a COM object 220 to the host application 102 by calling the host application plugin API 110 (block 224).

For example, assume that the host application 102 is a web browser and the hostable compiler 108 is a F# compiler. The F# compiler is configured to execute as a plugin to the web browser. The F# compiler and the web browser agree to a protocol for exchanging data which utilizes a web browser plugin API and a F# compiler plugin interface. The F# compiler requests that the web browser provide to the F# compiler, the HyperText Markup Language (HTML) text of a web page prior to the browser rendering the web page. The web browser may pass the HTML text to the F# compiler plugin interface by packaging the HTML text as a COM object which is passed to the F# compiler plugin through an API call.

The F# compiler plugin interface receives the COM object and finds a corresponding .NET type for each data element in the HTML text which is then represented by a new .NET object. This conversion may be facilitated using System.Refllection.Emit classes. The .NET object and its corresponding string of .NET types are included in the type environment that the F# compiler uses when performing type checking and type inference.

A user may enter F# source code through the web browser that needs to be compiled. The F# source code may contain data elements that have not been declared yet may have been used in the web page's HTML text. During the compilation process, the F# compiler may use the type information from the HTML text to infer the missing types of values of expressions used in the F# source code that are not declared.

Figure 3:
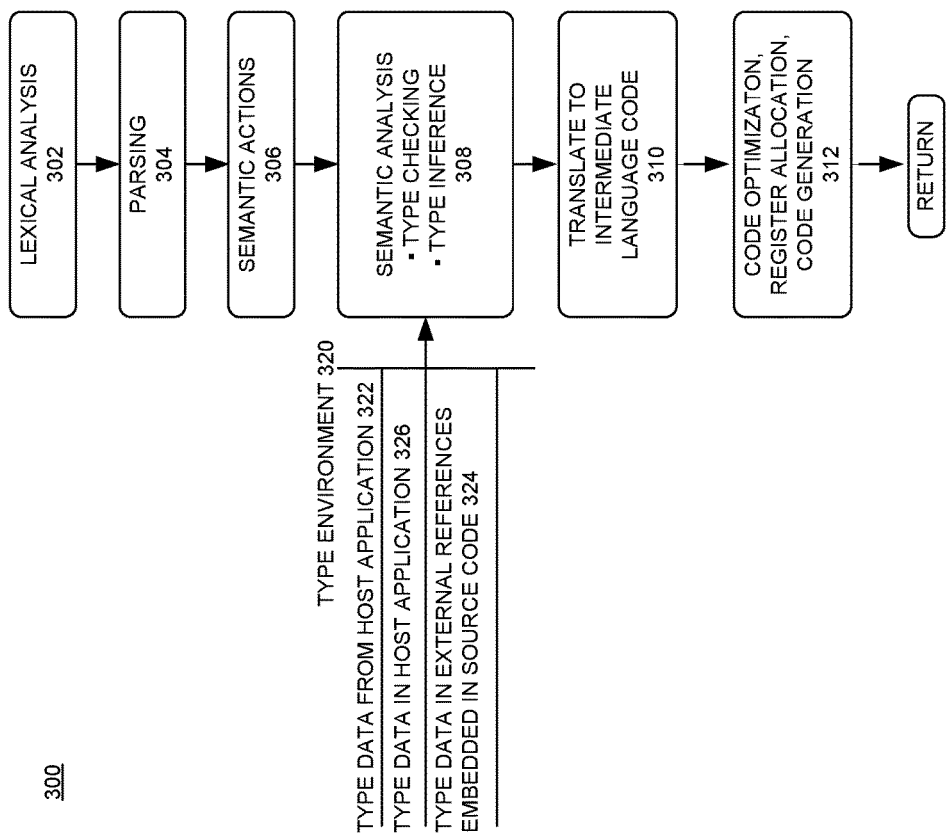
FIG. 3 is a flow diagram illustrating an exemplary compilation process.

Attention now turns to a discussion of the hostable compiler's use of the type information in the compilation process. FIG. 3 illustrates an exemplary method that may be used by the hostable compiler in compiling source code. The hostable compiler performs lexical analysis which scans the source code line-by-line and character-by-character to create a string of tokens (block 302). The parsing phase takes the string of tokens and generates an abstract syntax tree representing the syntactic structure of the program in accordance with the grammar of the programming language (block 304).

The semantic analysis phase takes the abstract syntax tree and checks the program for semantic correctness (block 306). In particular, in the semantic analysis phase, typing checking and type inference is performed. Type checking ensures that expressions in the abstract syntax tree are in compliance with the grammar of the programming language. For those data elements and expressions not explicitly declared with a type, type inference is used to deduce a type for the value of an expression. The type inference process may utilize the type environment 320 which contains type information from the host application 322, type information from the source code 324, and type information from external references 326 (block 308). A symbol table may be generated containing the data elements used in the source code and their corresponding type.

The abstract syntax tree and the symbol table take may then be used to generate an intermediate language assembly code of the source code (block 310). Code optimizations may be performed on the intermediate language assembly code, register allocations may be made and executable machine code may then be generated (block 312).

Attention now turns to a discussion of exemplary operating environments. In order to provide a context for the subject matter disclosed herein, the following discussion and associated figures, provide a brief general description of suitable operating environments in which various embodiments may be implemented.

Figure 4:
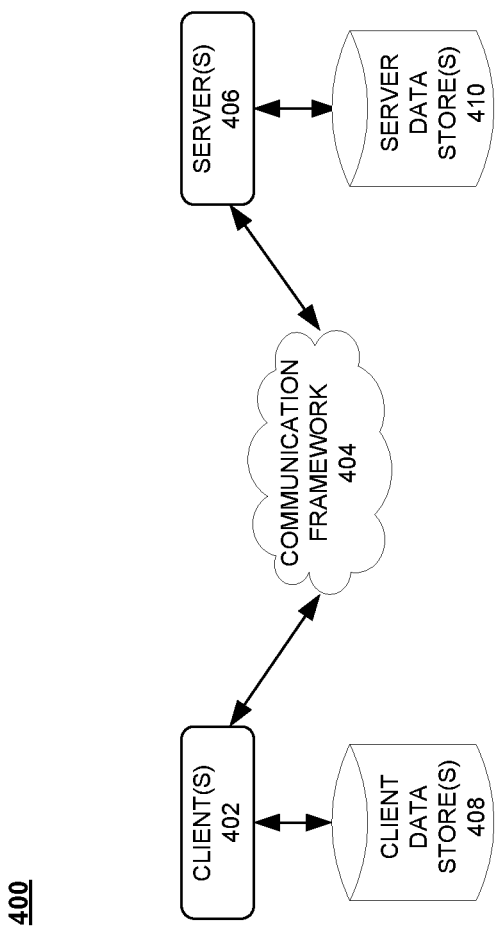
FIG. 4 is a block diagram illustrating a first operating environment.

FIG. 4 illustrates a first operating environment 400. It should be noted that the operating environment 400 is exemplary and is not intended to suggest any limitation as to the functionality of the embodiments. The embodiment may be applied to an operating environment 400 having one or more client(s) 402 in communication through a communications framework 404 with one or more server(s) 406. The operating environment 400 may be configured in a network environment, a distributed environment, a multiprocessor environment, or as a stand-alone computing device having access to remote and/or local storage devices.

A client 402 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 402 may also be embodied as a software module having instructions that execute in a single execution path, multiple concurrent execution paths (e.g., thread, process, etc.), or in any other manner.

A server 406 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 406 may also be embodied as a software module having instructions that execute in a single execution path, multiple concurrent execution paths (e.g., thread, process, etc.), or in any other manner.

The communications framework 404 facilitates communications between the client 402 and the server 406. The communications framework 404 may embody any type of communications medium, such as wired or wireless networks, utilizing any communication protocol. Each client(s) 402 may be coupled to one or more client data store(s) 408 that store information local to the client 402. Each server(s) 406 may be coupled to one or more server data store(s) 410 that store information local to the server 406.

Figure 5:
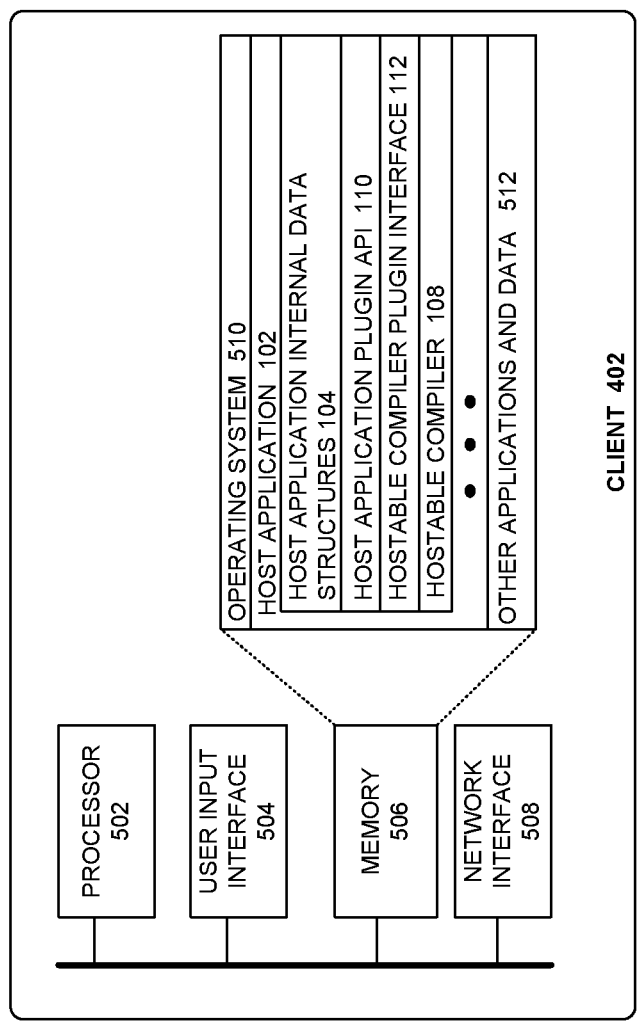
FIG. 5 is a block diagram illustrating an exemplary computing device.

FIG. 5 illustrates a block diagram of an exemplary client 402. The client 402 may have a processor 502, a user input interface 504, a memory 506, and a network interface 508. The processor 502 may be any commercially available processor and may include dual microprocessors and multi-processor architectures. The user input interface 504 facilitates communications between the client 402 and input devices, such as a keyboard, mouse, touch screen, etc. The network interface 508 facilitates wired or wireless communications between the client and a communications framework.

The memory 506 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 506 may also include one or more external storage devices or remotely located storage devices. The memory may 506 contain instructions and data as follows:
an operating system 510;
a host application 102 having a host application internal data structures 104, a host application plugin API 110, a hostable compiler plugin interface 112, and a hostable compiler 108; and
various other applications and data 512.

Figure 6:
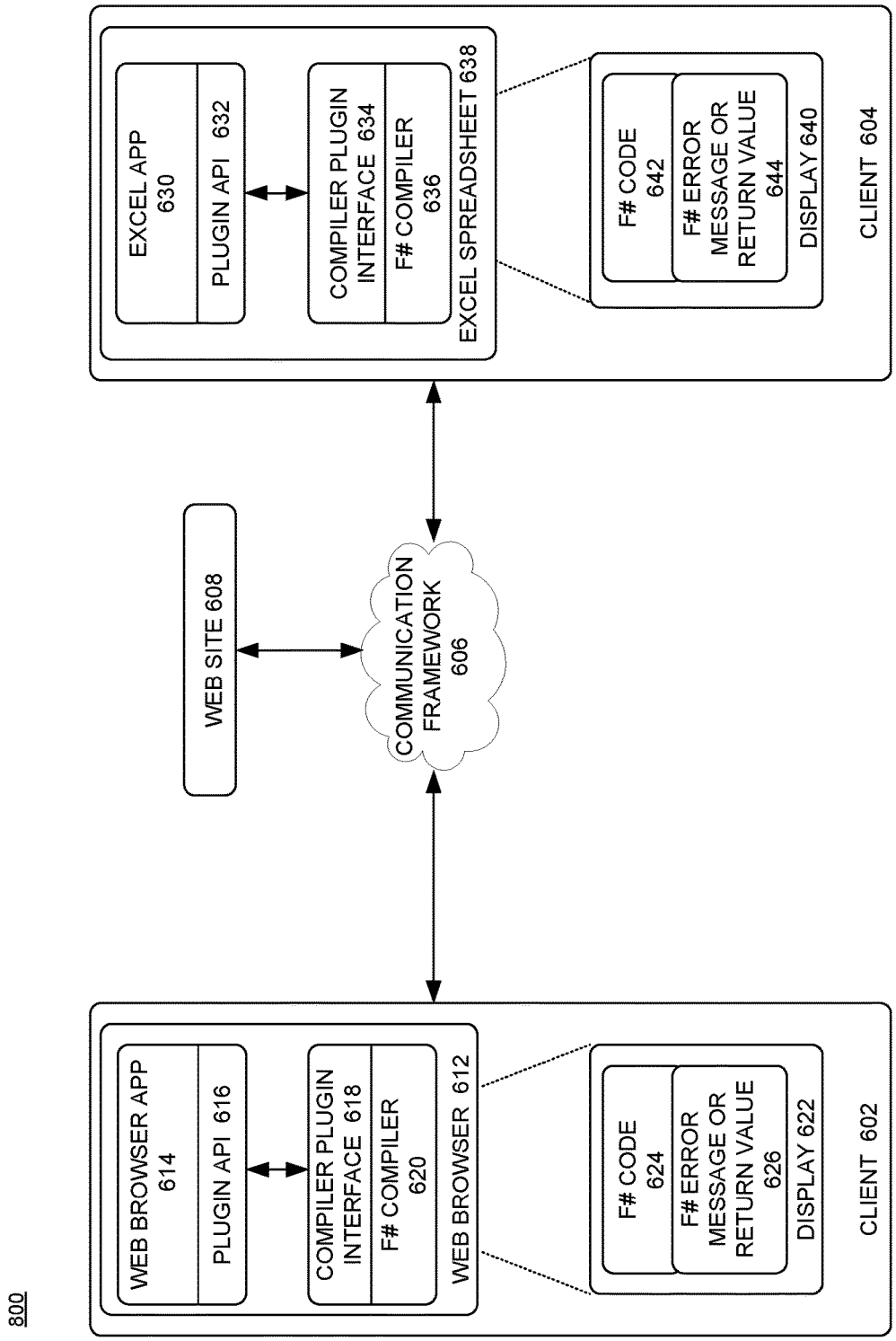
FIG. 6 is a block diagram illustrating a second operating environment.

FIG. 6 illustrates a second operating environment. Referring to FIG. 6, there is shown a system 600 having client 602, client 604, web site or server 608, all coupled to a communication framework 606. Client 602 illustrates a configuration where the hostable compiler is an F# compiler and the host application is a web browser. Client 604 illustrates a configuration where the hostable compiler is an F# compiler and the host application is an excel spreadsheet.

It should be noted that although operating environment 600 is shown in a certain arrangement, it is understood that the operating environment 600 may include more or less elements in alternate arrangements as desired for a given implementation. Likewise, although clients 602 and 604 are shown in a certain configuration, it is understood that client 602 and client 604 may include more or less elements in alternate configurations as desired for a given implementation. For example, operating environment 600 is not constrained to the use of client 602 and client 604 together. The embodiments may utilize any configuration of clients for an intended implementation.

Client 602 may have a web browser 612 that includes a web browser application (web browser app) 614 and an F# compiler 620. The web browser application 614 has a plugin API 616 that interacts with a compiler plugin interface 618. The F# compiler 620 runs in the same process as the web browser 612.

The web browser 612 may navigate to web site 608 and fetch the web site's HTML web page which may be rendered onto display 622. The web site's HTML web page may contain an expression that is declared with a particular type. The web browser's internal data structures that are used to represent the web site's HTML web page may be passed to the F# compiler 620. The web page may then accept user input in the form of F# source code 624. The web browser 612 may pass the F# source code 624 to the F# compiler 620, as noted above. The F# compiler 620 compiles the F# source code 624 and then executes the F# code, if there are no compilation errors. The web browser 612 may receive either a compilation error message or a return value 626 from the F# compiler 620 which the web browser 612 displays.

Client 604 may have an excel spreadsheet 638 that includes an excel application 630 and an F# compiler 636. The excel application 630 has a plugin API 632 that interacts with a compiler plugin interface 634. The F# compiler 636 runs in the same process as the excel application 630.

The excel application 630 may fetch an excel spreadsheet 638 which may be rendered onto a display 640. The excel spreadsheet may contain an expression that is declared with a particular type. The excel application's internal data structures are used to represent the excel spreadsheet that may be passed to the F# compiler. The excel spreadsheet 638 may then accept user input in the form of F# source code 642. The excel app 630 may pass the F# source code 642 to the F# compiler 636, as noted above. The F# compiler 636 compiles the F# source code 642, as noted above, and then executes the F# code, if there are no compilation errors. The excel app 630 receives a compilation error message or a return value 644 from the F# compiler 636 which the excel app 630 displays in the excel spreadsheet 638.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or rewriteable memory, and so forth. Examples of the logic may include various software elements, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed:

1. A computer-implemented method, comprising:
rendering in a web browser a web page;
passing type data derived from execution of the web page into a type environment of a compiler hosted by the web browser;
accepting by the web browser user input, the user input including source code associated with the hostable compiler;
passing the source code to the hostable compiler; and
compiling with the hostable compiler, the source code entered through the web browser using the type environment,
wherein the hostable compiler uses the type environment to infer a type for a data element in the source code not associated with a type.

2. The method of claim 1, further comprising:
executing the compiled source code;
returning at least one value from execution of the compiled source code block to the web browser.

3. The method of claim 2, wherein returning the at least one value from execution of the compiled source code further comprises:
transforming the at least one value into an object formatted into a common data format.

4. The method of claim 1, wherein passing the user input to the hostable compiler further comprises:
establishing a protocol to exchange data between the web browser and the hostable compiler.

5. The method of claim 1, wherein passing the user input to the hostable compiler further comprises:
packaging the program code as an object formatted in a common data format.

6. The method of claim 1,
wherein the source code includes one or more data elements, at least one of the one or more data elements not associated with a data type,
wherein rendering the webpage generates a type for the at least one of the one or more data elements not associated with a data type.

7. The method of claim 1, wherein compiling the source code further comprises:
inferring a missing type of a value of an expression used in the source code that is not associated with a type, with a type from the type environment.

8. A system, comprising:
at least one processor and a memory;
a web browser, configured to:
receive a web page including program code, the program code comprising one or more data elements associated with a respective data type; and
receive a source code input into the web browser, the source code having at least one data element not associated with a data type; and
a compiler hosted by the web browser that is configured to compile the source code, the hosted compiler having a type environment that is used to infer data types for data elements not having been declared with a data type,
wherein the hosted compiler incorporates data types of data elements in the web page into the type environment, and
wherein the hosted compiler compiles the source code using the type environment.

9. The system of claim 8, wherein the hosted compile infers a data type for a data element in the source code using a data type associated with data element in the web page.

10. The system of claim 8, wherein the hosted compile executes the compiled source code and returns at least one value back to the web browser.

11. The system of claim 8, further comprises:
an interface between the web browser and the hosted compiler that enables data to be passed between the web browser and the hosted compiler.

12. The system of claim 8, wherein the source code is passed to the hosted compiler as an object formatted in a common data format, wherein the common data format includes at least one of a Common Object Model (COM), an Extensible Markup Language (XML) text, a Java Script Object Notation (JSON) and a .NET object.

13. The system of claim 8, wherein the type environment includes data types from the web browser, data types from source code compiled by the hosted compiler, and data types in external references embedded in source code compiled by the hosted compiler.

14. A device, comprising:
at least one processor and a memory;
wherein the at least one processor executes a web browser, wherein the web browser is configured to:
host a compiler;
render a web pane, the web page including data elements associated with a data type;
receive source code associated with the compiler as user input; and
pass the source code as an object to the hostable compiler;
wherein the at least one processor executes the hostable compiler, wherein the hostable compiler is configured to:
incorporate data types from the web page into a type environment of the hostable compiler; and
during compilation of the source code, infer a data type for a data element of the source code using a data type from the type environment.

15. The device of claim 14, wherein the web browser is configured to interface with the hostable compiler through a web browser application programming interface (API).

16. The device of claim 14, wherein the hostable compiler is a plug-in to the web browser.

17. The device of claim 14,
wherein the web browser passes the source code to the hostable compiler as a Common Object Model (COM) object and the hostable compiler transforms data types of the COM object into a .NET type.

18. The device of claim 14,
wherein the type environment includes data types of external references embedded in the source code, data types of applications hosted by the web browser, and data types from the web browser.

19. The device of claim 14, wherein the hostable compiler is further configured to:
execute the compiled source code; and
return to the web browser one or more values output from execution of the compiled source code.

* * * * *